(12) United States Patent
Yanchuleff et al.

(10) Patent No.: US 11,385,946 B2
(45) Date of Patent: *Jul. 12, 2022

(54) REAL-TIME FILE SYSTEM EVENT MAPPING TO CLOUD EVENTS

(71) Applicant: Citrix Systems, Inc., Fort Lauderdale, FL (US)

(72) Inventors: Jason Yanchuleff, Raleigh, NC (US); Ajay Kumar, Raleigh, NC (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,712

(22) Filed: Oct. 7, 2020

(65) Prior Publication Data

US 2021/0019201 A1 Jan. 21, 2021

Related U.S. Application Data

(63) Continuation of application No. 16/022,900, filed on Jun. 29, 2018, now Pat. No. 10,838,784.

(51) Int. Cl.
*G06F 9/54* (2006.01)
*G06F 9/48* (2006.01)
*G06F 16/17* (2019.01)

(52) U.S. Cl.
CPC .......... *G06F 9/542* (2013.01); *G06F 9/4881* (2013.01); *G06F 9/546* (2013.01); *G06F 16/1734* (2019.01); *G06F 2209/548* (2013.01)

(58) Field of Classification Search
CPC .... G06F 9/4881; G06F 9/54; G06F 2209/548; G06F 9/542; G06F 9/546
See application file for complete search history.

(56) References Cited

U.S. PATENT DOCUMENTS

| 6,058,389 A * | 5/2000 | Chandra ............... G06F 16/252 |
| 10,313,219 B1 | 6/2019 | Burcham et al. |
| 2002/0133325 A1* | 9/2002 | Hoare, II ............... G06F 30/20 703/17 |

(Continued)

OTHER PUBLICATIONS

Nov. 27, 2019—U.S. Non-final Office Action—U.S. Appl. No. 16/022,900.

(Continued)

*Primary Examiner* — Tuan C Dao
(74) *Attorney, Agent, or Firm* — Banner & Witcoff, Ltd.

(57) ABSTRACT

Aspects of the disclosure relate to processing systems using improved techniques for mapping events from user device to a cloud storage system. A computing platform, such as a cloud event mapping platform, may receive, at a task manager hosted on the computing platform, events to be processed. The computing platform may use the task manager to determine file objects corresponding to each event. The computing platform may use the task manager to determine a subset of the events to be processed by each dispatcher. The computing platform may use a first dispatcher to generate an event dispatch queue using a plurality of heuristics. After determining expiration of a delay corresponding to each event in the dispatch queue, the computing platform may dispatch each event in the dispatch queue for execution.

20 Claims, 12 Drawing Sheets

(56) References Cited

U.S. PATENT DOCUMENTS

| | | | |
|---|---|---|---|
| 2004/0083286 A1* | 4/2004 | Holden | G06F 21/31 |
| | | | 709/225 |
| 2004/0163091 A1 | 8/2004 | Brill | |
| 2004/0260831 A1 | 12/2004 | Dyck et al. | |
| 2005/0050148 A1* | 3/2005 | Mohammadioun | H04L 69/40 |
| | | | 726/4 |
| 2005/0251540 A1* | 11/2005 | Sim-Tang | G06F 11/1471 |
| 2008/0307435 A1* | 12/2008 | Rehman | G06F 9/542 |
| | | | 719/318 |
| 2010/0217905 A1* | 8/2010 | Arimilli | G06F 9/546 |
| | | | 710/263 |
| 2010/0287222 A1 | 11/2010 | Wright et al. | |
| 2011/0161132 A1 | 6/2011 | Goel et al. | |
| 2011/0307547 A1* | 12/2011 | Backer | G06Q 10/1095 |
| | | | 709/203 |
| 2012/0029901 A1* | 2/2012 | Nielsen | G06F 9/542 |
| | | | 703/22 |
| 2013/0081064 A1 | 3/2013 | Huang et al. | |
| 2013/0304694 A1 | 11/2013 | Barreto et al. | |
| 2017/0075733 A1 | 3/2017 | Kannan | |
| 2017/0264579 A1 | 9/2017 | Fang et al. | |

OTHER PUBLICATIONS

May 1, 2020—U.S. Final Office Action—U.S. Appl. No. 16/022,900.
Jul. 28, 2020—U.S. Notice of Allowance—U.S. Appl. No. 16/022,900.

\* cited by examiner

REAL-TIME FILE SYSTEM EVENT MAPPING TO CLOUD EVENTS

CROSS-REFERENCE TO RELATED APPLICATIONS

The present application is a continuation of U.S. Ser. No. 16/022,900 filed on Jun. 29, 2018 (now U.S. Pat. No. 10,838,784), and entitled "Real-Time File System Event Mapping to Cloud Events," which is hereby incorporated by reference as to its entirety.

FIELD

Aspects described herein generally relate to enhancing processing systems for performing event mapping from a local file system to a cloud environment. In particular, one or more aspects of the disclosure relate to using a client side file manager to route events corresponding to file objects via dispatchers. One or more aspects of the disclosure also relate to using these dispatchers to apply heuristics to their respective dispatch queues, and to dispatch the events in the various dispatch queues after determining expiration of a time delay corresponding to each event.

BACKGROUND

Many organizations and individuals rely on cloud storage applications as a means for storing and accessing various files. It may be important to ensure an effective and efficient method for mapping events from a user's local file system to a cloud environment. In many instances, however, it may be difficult to facilitate event mapping in near real time while ensuring that events are effectively executed by the cloud environment.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for mapping events from a local file system to a cloud environment in near real time. In one or more embodiments, a cloud event mapping platform comprising at least one processor, a communication interface, and memory may receive, at a task manager hosted on the cloud event mapping platform, one or more events to be processed by the cloud event mapping platform. The cloud event mapping platform may determine, using the task manager, one or more file objects corresponding to the one or more events. The cloud event mapping platform may determine, using the task manager, a subset of the one or more events to be processed by each of a plurality of dispatchers. The cloud event mapping platform may process, using a first dispatcher, a first subset of events to generate a dispatch queue. The cloud event mapping platform may determine, using the first dispatcher, an expiration of a time delay corresponding to each event in the dispatch queue. The cloud event mapping platform may dispatch, using the first dispatcher and based on determining the expiration of the time delay corresponding to each event in the dispatch queue, each event of the first subset of events in the dispatch queue for execution in a cloud environment.

In some embodiments, the cloud event mapping platform may generate the dispatch queue by translating at least one of the first subset of events from a first domain to a second domain.

In some embodiments, the cloud event mapping platform may translate the at least one of the first subset of events from the first domain to the second domain by deleting at least one of the first subset of events.

In some embodiments, the cloud event mapping platform may delete at least one of the first subset of events in response to determining that the dispatch queue already contains one or more of the first subset of events.

In some embodiments, the cloud event mapping platform may translate the first subset of events from the first domain to the second domain by adding an event to the first subset of events.

In some embodiments, the cloud event mapping platform may determine the subset of the one or more events to be processed by each dispatcher in real time as the one or more events are received.

In some embodiments, the cloud event mapping platform may process, using a second dispatcher, a second subset of events to generate a second dispatch queue. In these embodiments, the first dispatcher may correspond to a first file object and the second dispatcher may correspond to a second file object. The cloud event mapping platform may determine, using the second dispatcher, that there is a remaining time delay corresponding to an event in the second dispatch queue. The cloud event mapping platform may dispatch, using the second dispatcher and after determining expiration of the remaining time delay, each of the second subset of events in the second dispatch queue for execution.

In some embodiments, the task manager may be a first object hosted by the cloud event mapping platform configured to translate events from a source domain to a destination domain by identifying each of the one or more events, determine a dispatcher for each of the one or more events, and provide the one or more events to the respective dispatchers.

In some embodiments, the source domain may correspond to a local file system, the destination domain may correspond to the cloud environment, and the one or more events may correspond to events taken on cloud-based files by the local file system.

In some embodiments, the cloud event mapping platform may translate the events from the source domain to the destination domain by causing a cloud storage application to update data in the cloud environment based on the one or more events from the local file system.

In some embodiments, the cloud event mapping platform may update, based on execution of the one or more events, the cloud storage application.

In some embodiments, the plurality of dispatchers may include a second dispatcher comprising a second object hosted by the cloud event mapping platform. The second dispatcher may be configured to add an event to a second dispatch queue, perform heuristics on the second dispatch queue, and provide the second dispatch queue for execution after a predetermined period of time.

In some embodiments, the cloud event mapping platform may determine a different predetermined period of time for each event type represented in the dispatch queue.

In some embodiments, the cloud event mapping platform may perform the heuristics on the dispatch queue by performing one or more of: modifying, eliminating, and adding events.

In some embodiments, the cloud event mapping platform may dynamically adjust the predetermined period of time based on an event context.

In some embodiments, each of the plurality of dispatchers may be hosted by the cloud event mapping platform and each of the one or more dispatchers may correspond to a different file object.

In some embodiments, the predetermined period of time may be adjusted at the first dispatcher and the event context may correspond to an event at the second dispatcher.

In some embodiments, the cloud event mapping platform may determine the heuristics using one or more machine learning algorithms and one or more machine learning datasets stored at the cloud event mapping platform.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
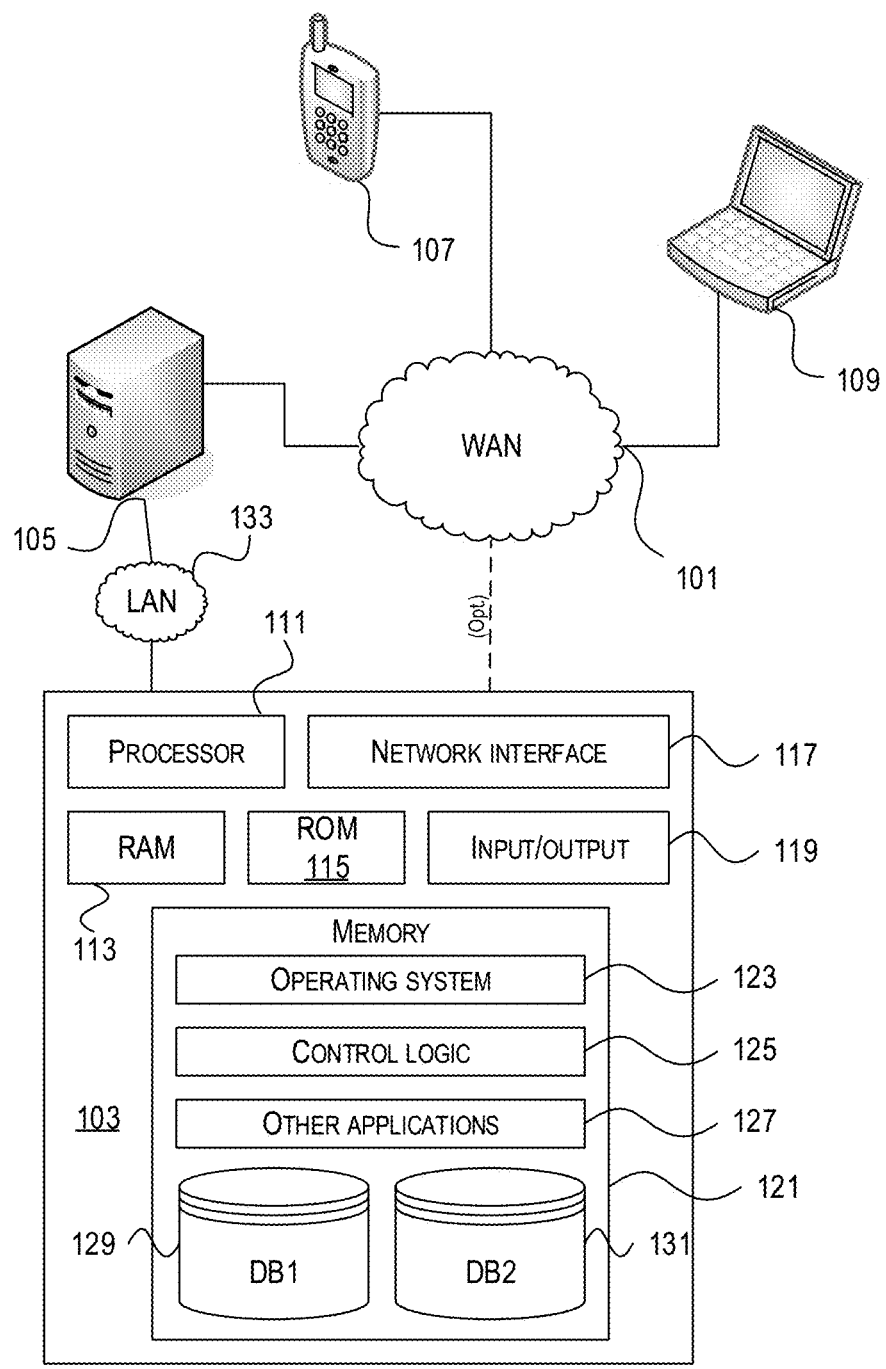
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems and methods for event mapping from a local file system to a cloud environment. A task manager, hosted on a cloud event mapping platform, may route events, received from the local file system, to various dispatchers based on file objects corresponding to the events. The dispatchers may apply a series of heuristics to their respective dispatch queues. The dispatchers may each determine expiration of a time delay corresponding to events in their respective dispatch queues, and may dispatch the events for backend execution by the cloud environment. In these ways, the cloud event mapping platform may enable mapping of events at a local file system to a cloud environment in near real time, while still maintaining a proper execution order of the events in backend processing. As a result, inaccurate sequencing and execution of events in the cloud environment may be prevented and individuals may effectively perform various actions on cloud based files from a local device.

Further, this solution may address complications caused by attempting to achieve near real time performance in cloud event mapping using asynchronous and synchronous approaches. In the asynchronous approach, events arriving at a processing queue while other events are being executed may cause the executing event to fail if the new event modifies the state that the previous events were dependent on. In some examples, this may present concurrency issues and may make error recovery difficult because the event state may not remain consistently synchronized between a source domain and a destination domain. In the synchronous approach, each event may be processed in the order they are received in the processing queue. In addition, events may not be processed until previous events have been executed. This may result in a delay corresponding to execution of each event. As a result, both the synchronous and asynchronous approach may suffer from the fact that it is not necessarily safe to process all events precisely as they are received. Rather, by processing events in the precise order that they are received may create an undesired state in the source domain, the destination domain, or both. In attempting to mitigate creation of an undesired state, previously queued events may be modified. However, without a controlled delay corresponding to each event, the cloud environment may be unable to ensure that a problematic event has not already been executed before a new event that should modify the previous event has been added to the processing queue. The proposed method provides a solution to such problems.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
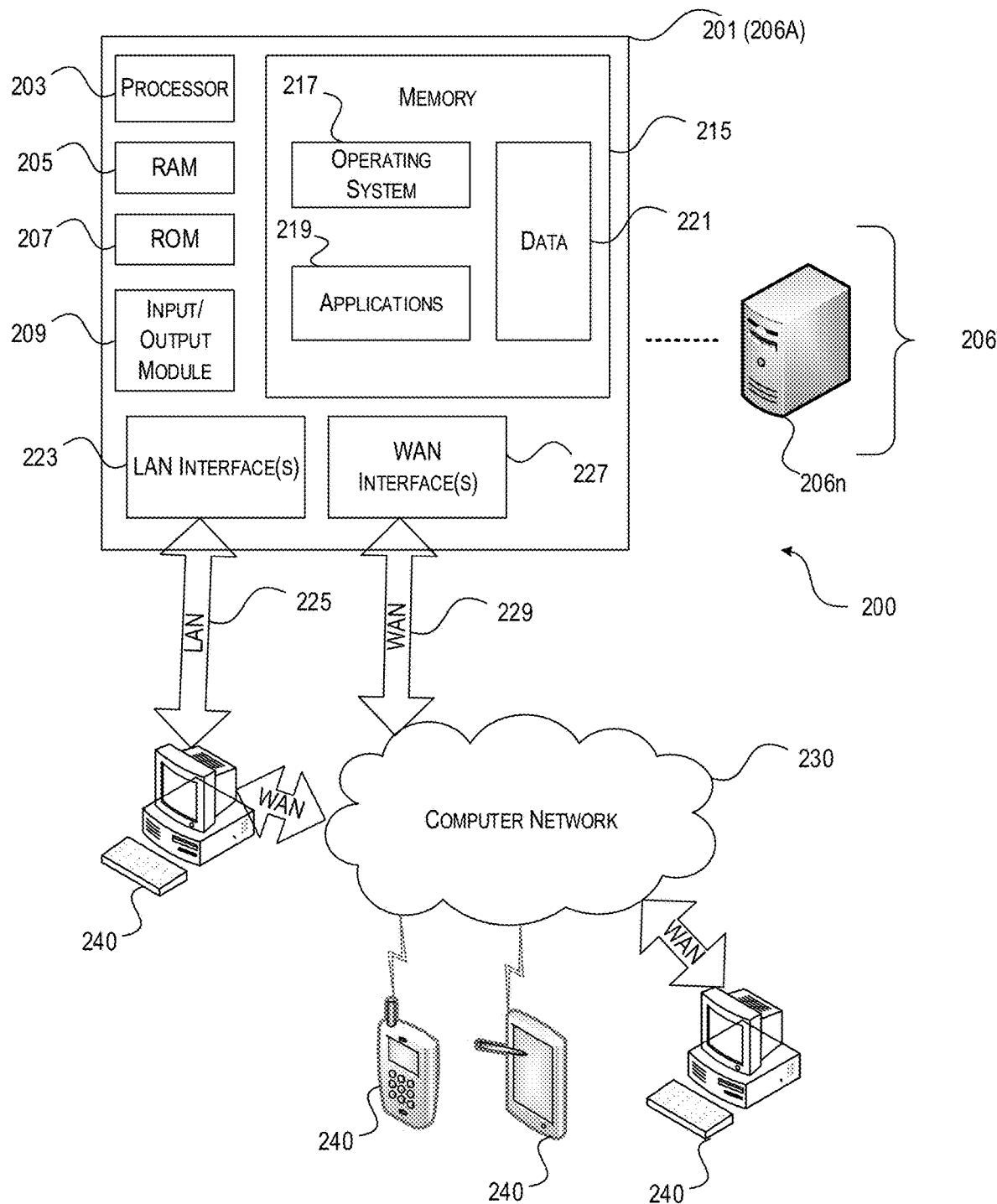
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and may be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
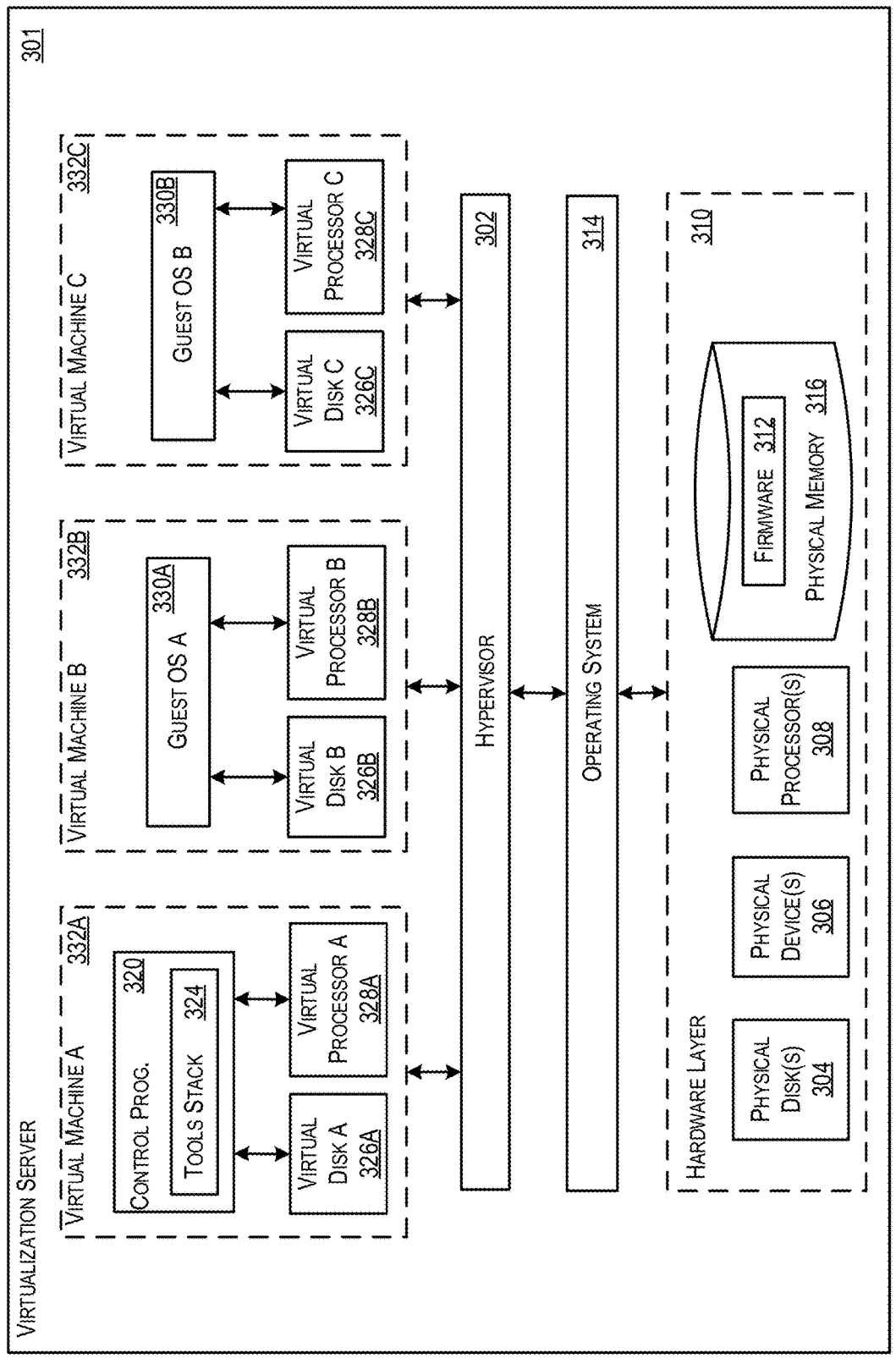
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
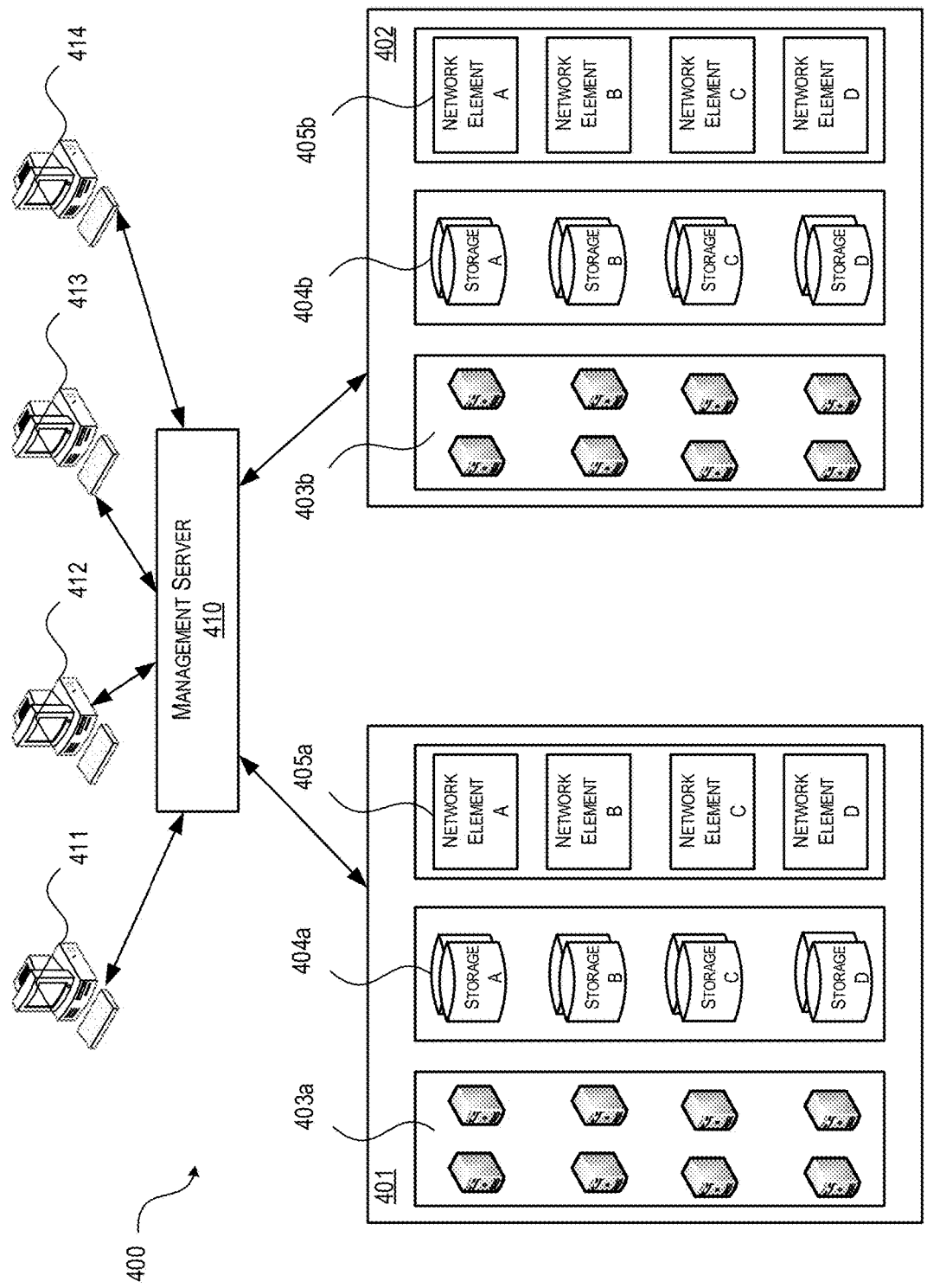
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
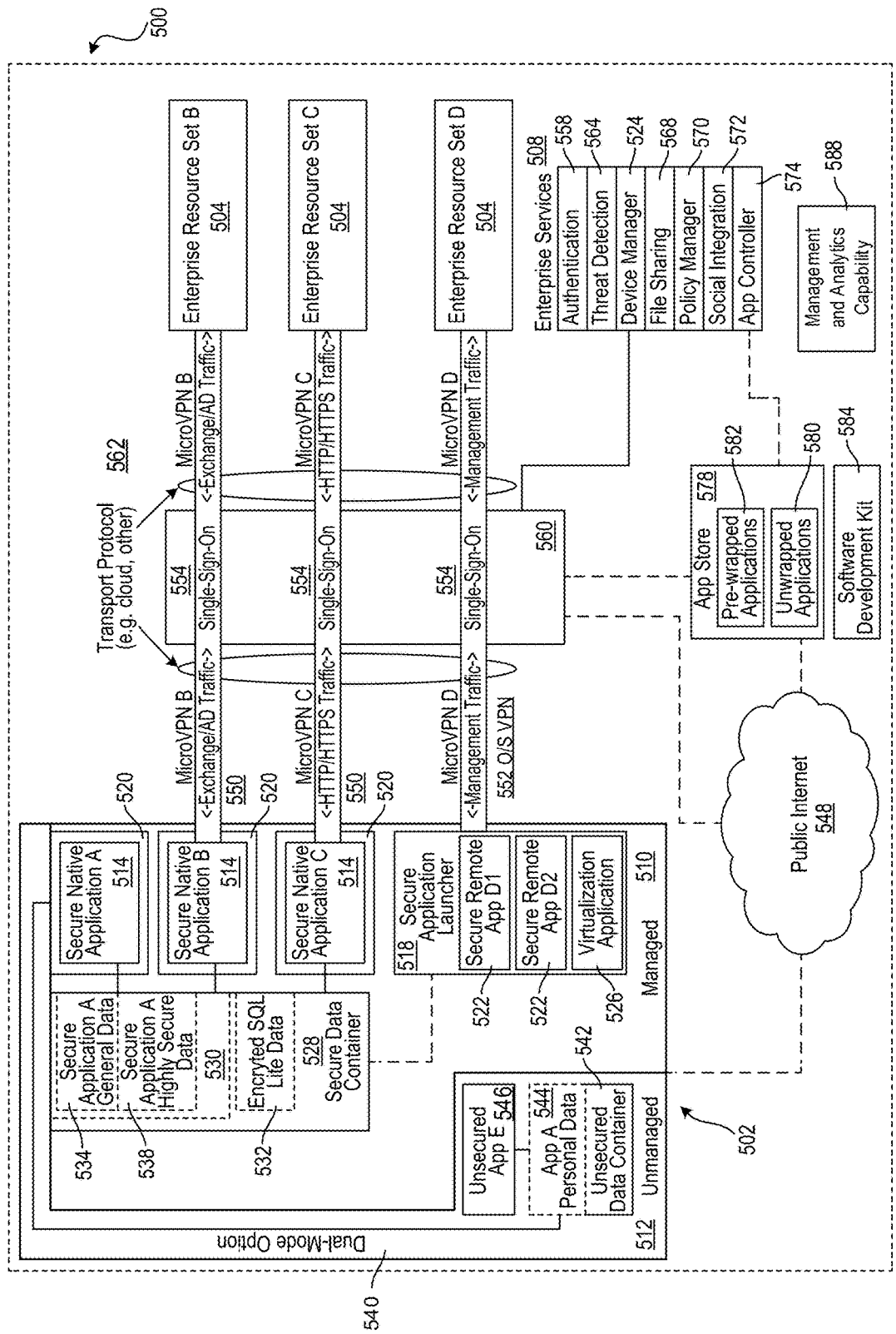
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container 528 may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway 560 via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
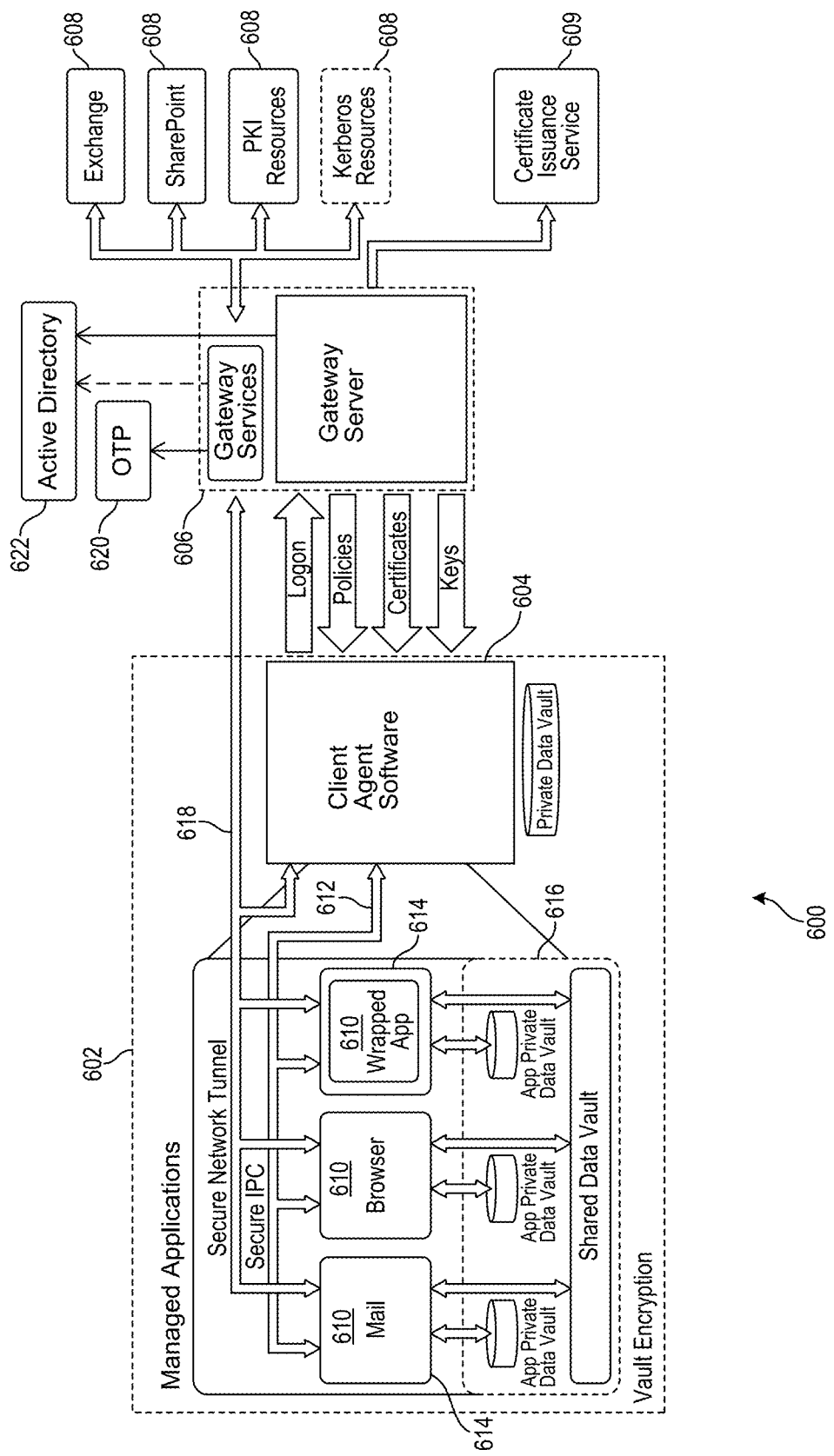
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PM) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PM protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PM protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PM protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Real-Time File System Event Mapping to Cloud Events

Figure 7A:
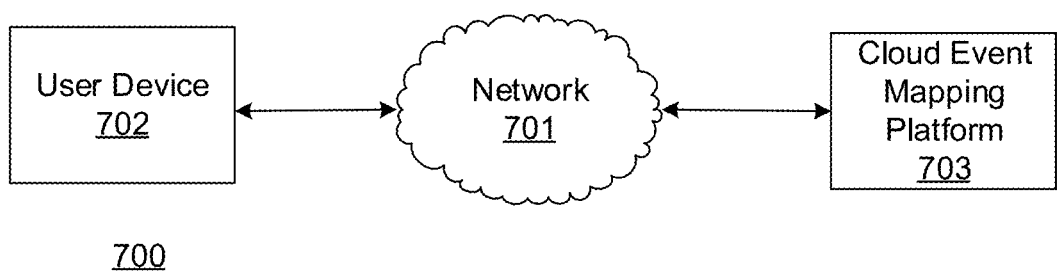
FIGS. 7A-7B depict an illustrative computing environment for deploying a cloud event mapping platform that utilizes improved event processing and dispatch techniques in accordance with one or more illustrative aspects described herein.
Figure 7B:
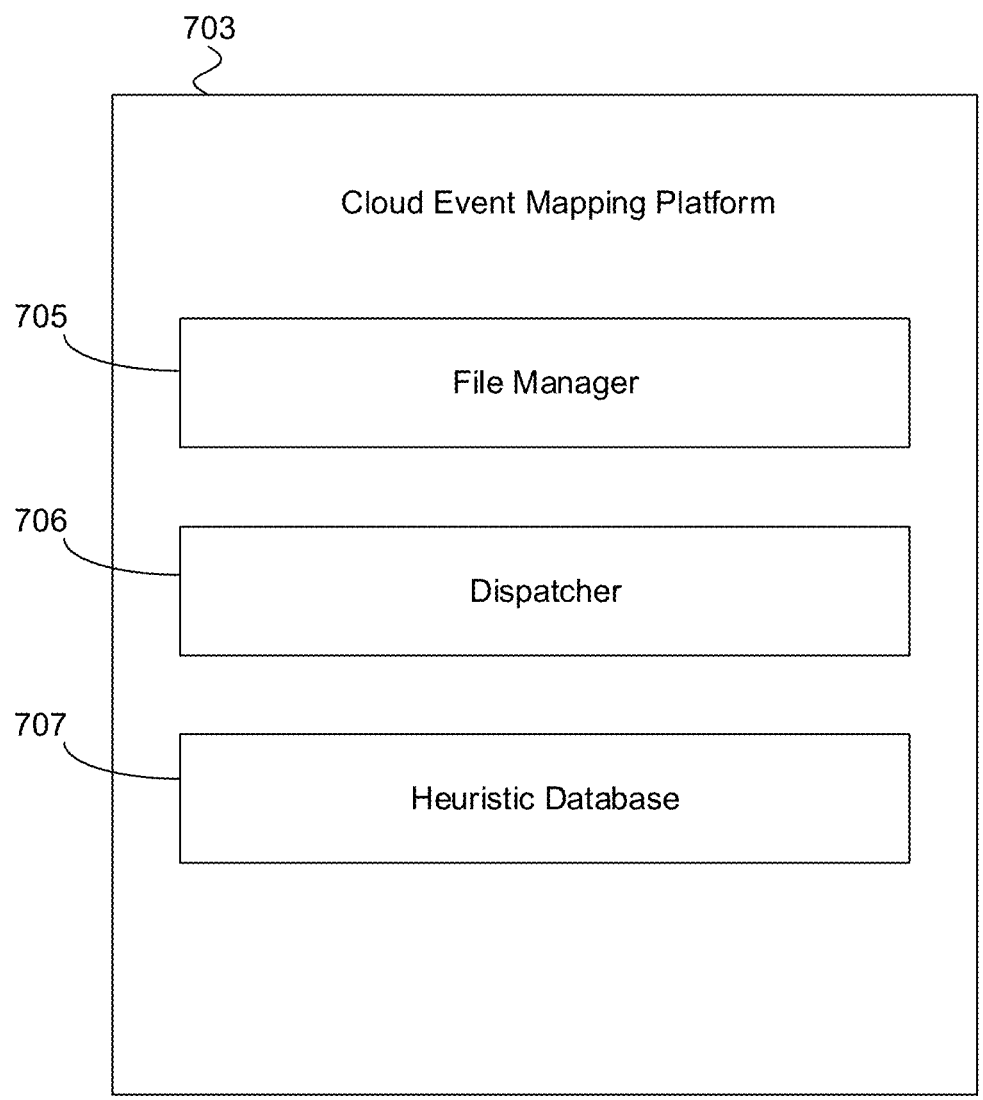

FIGS. 7A-7B depict an illustrative computing environment for deploying a system for performing real-time file system to cloud event mapping that utilizes improved cloud event mapping techniques in accordance with one or more example embodiments. Referring to FIG. 7A, computing environment 700 may include one or more computer systems. For example, computing environment 700 may include a user device 702, and a cloud event mapping platform 703. The network 701 may interconnect one or more of user device 702 and cloud event mapping platform 703. User device 702 may include one or more computing devices and/or other computer components (e.g., processors, memories, communication interfaces). In addition, and as illustrated in greater detail below, user device 702 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by user device 702 may correspond to a file storage service used to upload and save files using the cloud.

As illustrated in greater detail below, cloud event mapping platform 703 may include one or more computing devices configured to perform one or more of the functions described herein. For example, cloud event mapping platform 703 may include one or more computers (e.g., laptop computers, desktop computers, servers, server blades, or the like). In some examples, cloud event mapping platform 703 may implement one or more of a file manager, a dispatcher, and a heuristic database. In some examples, the cloud event mapping platform 703 may be integrated into the user device 702.

Computing environment 700 also may include one or more networks, which may interconnect user device 702 and cloud event mapping platform 703. For example, computing environment 700 may include a network 701 (which may interconnect, e.g., user device 702 and cloud event mapping platform 703).

In one or more arrangements, user device 702, cloud event mapping platform 703, and/or the other systems included in computing environment 700 may be any type of computing device capable of receiving a user interface, receiving input via the user interface, and communicating the received input to one or more other computing devices. For example, user device 702, cloud event mapping platform 703, and/or the other systems included in computing environment 700 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of user device 702 and cloud event mapping platform 703 may, in some instances, be special-purpose computing devices configured to perform specific functions.

Referring to FIG. 7B, cloud event mapping platform 703 may include file manager 705, one or more dispatchers 706, and a heuristic database 707. In some examples, the cloud event mapping platform 703 may be integrated into the user device 702. File manager 705 may determine a file object corresponding to each of a plurality of events received, and may subsequently assign each of the plurality of events to an appropriate dispatcher 706 corresponding to a particular file object. File manager 705 may correspond to a global object hosted by the cloud event mapping platform 703. Dispatcher 706 may add received events to a dispatch queue, perform heuristics on the dispatch queue, and dispatch events from the dispatch queue to be executed after determining expiration of delays corresponding to the events. Dispatcher 706 may correspond to a secondary object, hosted by the cloud event mapping platform 703, that is tied to a particular file object. For example, cloud event mapping platform 703 may include multiple dispatchers 706 that each correspond to a different file object. Heuristic database 707 may maintain a plurality of heuristic rules to be applied to events by the dispatcher 706. In some examples, file manager 705, dispatcher 706, and heuristic database 707 may be implemented by a single computing device corresponding to the cloud event mapping platform 703. In other examples, file manager 705, dispatcher 706, and heuristic database 707 may be implemented by multiple different computing devices in a distributed architecture corresponding to the cloud event mapping platform 703.

Figure 8:
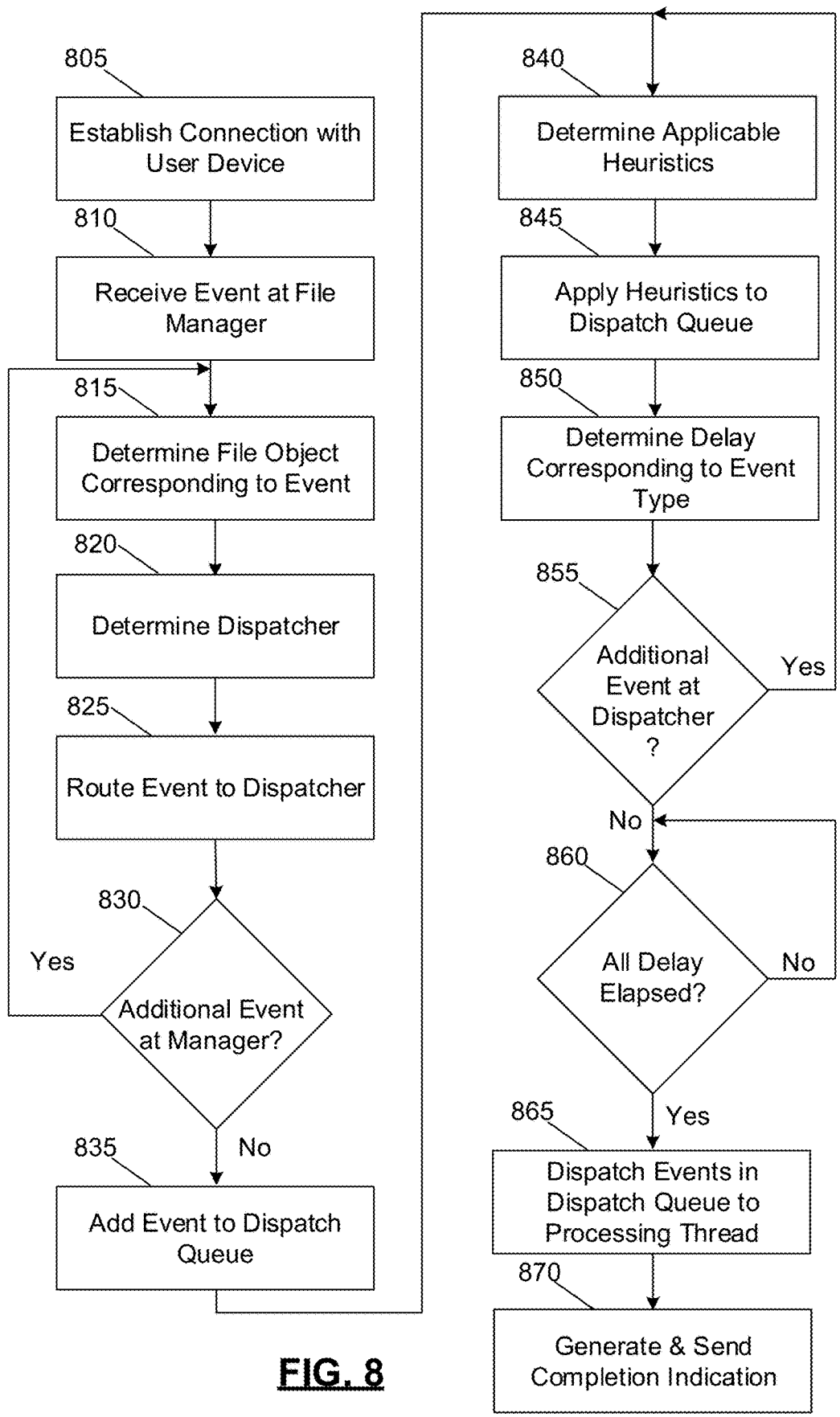
FIG. 8 depicts an illustrative method for deploying a cloud event mapping platform that utilizes improved event processing and dispatch techniques in accordance with one or more illustrative aspects described herein.

FIG. 8 depicts an illustrative method for deploying a platform that uses improved techniques to perform real-time event mapping from a local file system to the cloud in accordance with one or more example embodiments. Referring to FIG. 8, at step 805, a computing platform having at least one processor, a communication interface, and memory may establish a connection with a user device, such as user device 702. In some examples, the computing platform may be cloud event mapping platform 703. For example, the cloud event mapping platform 703 may establish a wireless data connection with the user device 702 to link the cloud event mapping platform 703 to the user device 702. In some examples, the cloud event mapping platform 703 may be integrated into the user device 702.

At step 810, the cloud event mapping platform 703 may receive an event at a file manager hosted by the cloud event mapping platform 703, such as file manager 705. In some examples, in receiving the event, the file manager 705 may receive events such as file_read, file_write, file_open, file_close, and the like. The file manager 705 may receive these events from a cloud file storage application accessible at the user device 702. For example, the user device 702 may generate one or more user interfaces corresponding to the cloud file storage application, and a user may provide a user input using the one or more user interfaces corresponding to an action to be performed in relation to a file (upload, delete, move, rename, and the like). In some examples, the user device 702 may generate one or more commands, based on the user input, directing the cloud event mapping platform 703 to perform the specified action, and the one or more commands may include the events.

At step 815, the cloud event mapping platform 703 may use the file manager 705 to determine a file object corresponding to each received event. In some examples, while the cloud event mapping platform 703 is determining the file object of a first event, another event may be received.

At step 820, the cloud event mapping platform 703 may use the file manager 705 to determine a dispatcher 706 for each of the received events. In some examples, the cloud event mapping platform 703 may determine a dispatcher 706 based on the file object determined at step 815.

At step 825, based on the determination at step 820, the file manager 705 may route the event to a particular dispatcher, such as the dispatcher 706. For example, cloud event mapping platform 703 may transfer the event from the file manager 705 to a dispatch queue at the dispatcher 706. In routing events to the dispatchers, the file manager 705 may cause the events to be translated from a source domain corresponding to the user device 702 to a destination domain corresponding to a cloud environment.

At step 830, the cloud event mapping platform 703 may determine whether an additional event is received at the file manager 705. If the cloud event mapping platform 703 determines that an additional event is received at the file manager 705, the cloud event mapping platform 703 may return to step 815 to determine the file object corresponding to the additional event. If the cloud event mapping platform 703 determines that an additional event has not been received at the file manager 705, the cloud event mapping platform 703 may proceed to step 835.

In some examples, after determining a file object of a first event at step 815, the file manager 705 may begin analyzing a second event to determine the file object of the second event. In these examples, the cloud event mapping platform 703 may not wait until the first event is routed to a dispatcher to begin analyzing the second event. In other examples, the file manager 705 may wait until the first event has been routed to a dispatcher before analyzing the second event.

At step 835, the dispatcher 706, determined above at step 820, may receive the event routed at step 825. After receiving the event, the dispatcher 706 may add the event to a dispatch queue at the dispatcher 706. In adding the event to the dispatch queue, the dispatcher 706 may add the event to a queue of events corresponding to the same file object that have not yet been released for execution by the cloud event mapping platform 703. In receiving the event, the dispatcher 706 may receive an event that has been translated from a source domain corresponding to the user device 702 (Domain A) to a destination domain corresponding to the cloud environment (Domain B).

At step 840, the cloud event mapping platform 703 may determine heuristics applicable to the dispatch queue at the dispatcher 706. For example, the cloud event mapping platform 703 may use the dispatcher 706 to determine that one or more events in the dispatch queue should be added, eliminated, or modified. In some examples, the dispatcher 706 may determine the heuristics using one or more machine learning algorithms and one or more machine learning datasets. In other examples, the dispatcher 706 may have a stored database of preconfigured heuristics. In determining the applicable heuristics, the cloud event mapping platform 703 may consult a database such as heuristic database 707, and may determine heuristics corresponding to an event type. In some examples, the heuristic database 707 may maintain one or more sets of heuristics for each dispatcher hosted at the cloud event mapping platform 703, and multiple dispatchers may simultaneously be determining heuristics for their respective dispatch queues. The dispatcher 706 may determine applicable heuristics each time a new event is added to the dispatch queue. In some examples, the dispatcher 706 may determine the heuristics based on a combination of events pending in the dispatch queue.

At step 845, the cloud event mapping platform 703 may use the dispatcher 706 to apply the heuristics, determined at step 840, to the dispatch queue. In applying the heuristics, the dispatcher 706 may translate events from the source domain (Domain A) corresponding to the user device 702 to the destination domain (Domain B) corresponding to the cloud environment. In one example, an event in the source domain may be equivalent to an event in the destination domain. In this example, another event in the source domain may not be equivalent to an event in the destination domain. For example, if A1 and A2 are events in the source domain and B1 and B2 are events in the destination domain, A1 may be equivalent to B1, but A2 may not necessarily equal B2.

In some examples, events in the destination domain may be a composite sequence of events in the source domain and/or events in the source domain may be a composite sequence of events in the destination domain. For example, if A1, A2, A3, and A4 are events in the source domain and B2 and B3 are events in the destination domain, A4 may be equivalent to [B2, B3] and [A2, A1, A1, A3] may be equivalent to B3. As another example, the dispatcher 706 may have determined, in determining the heuristics at step 840, that multiple upload events should be condensed into a single upload event if they are not separated by another event (e.g., upload, write, upload). In this example, if the dispatcher 706 determines that three consecutive upload events are pending in the dispatch queue, the dispatcher 706 may condense the three upload events to a single upload event. This may improve efficiency and conserve bandwidth at the cloud event mapping platform 703 and the dispatcher 706. In some examples, the dispatcher 706 may apply dependencies between operations that may allow for a series of subsequent events to be cancelled if a prior operation fails. By applying these heuristics, the dispatcher 706 may ensure that the translation that occurred between the source domain and the destination domain as events were routed to the dispatcher 706 is an accurate translation of the events.

Figure 10A:
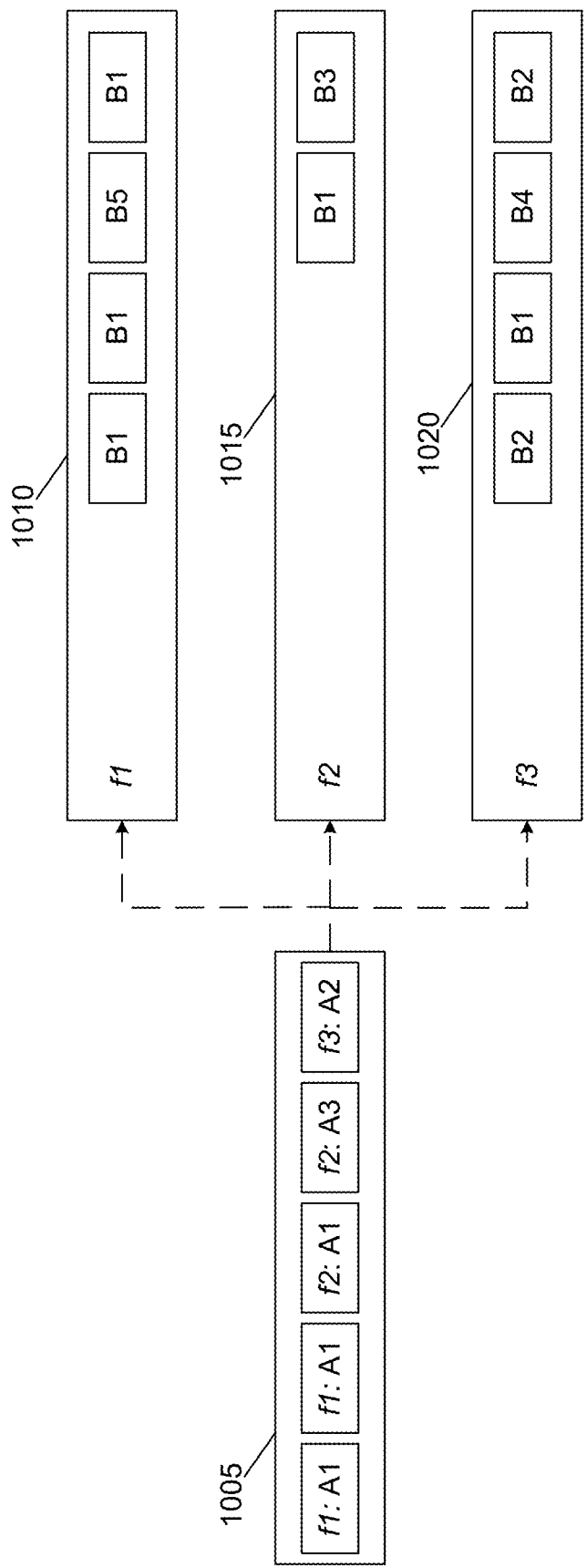
FIGS. 10A-10B depict applications of the improved event processing and dispatch techniques described in accordance with one or more illustrative aspects described herein.

As a particular example, a user may open a word processing file on the user device 702 and may attempt to save the word processing file on the cloud. This may cause a local file system to make a copy of the word processing file, delete the original version, and rename the copy to the original name of the word processing file. In this example, if the events are processed by a cloud environment as they are received, the cloud environment may cause a stored version of the word processing file prior to be deleted prior to receiving the rename command. To avoid deletion of the file, after receiving the delete command, the cloud event mapping platform 703 may hold the delete commands for a duration corresponding to a particular time delay in order to receive additional events prior to execution of the delete command. After receiving the rename command, the cloud event mapping platform 703 may determine that the user intends to save the file as opposed to deleting it. Thus, the dispatcher 706 may remove the delete event from the dispatch queue prior to releasing the events for execution. Another example of the determination and application of the heuristics described at steps 840 and 845 is depicted in FIG. 10A.

At step 850, the cloud event mapping platform 703 may use the dispatcher 706 to determine a delay time corresponding to the event. For example, in determining the delay time, the dispatcher 706 may consult a delay database hosted by the cloud event mapping platform 703. In some examples, the cloud event mapping platform 703 may determine the delay time using one or more machine learning algorithms and one or more machine learning datasets. In other examples, the cloud event mapping platform 703 may determine the delay time based on a stored listing of preconfigured delay times. In determining the delay time, the cloud event mapping platform 703 may determine an amount of time the dispatcher 706 should wait after receiving a particular event to determine if an additional event has been received. This may allow the dispatcher 706 to determine that translation of the events in the dispatch queue is complete before they are dispatched for execution. In some examples, delay times may vary based on event type. For example, file_read events may correspond to a first delay time and file_write events may correspond to a second delay time. In some examples, dispatcher 706 may determine the delay times based on context corresponding to other dispatchers and/or from additional sources of application state. In some examples, the delay times may vary based on event context. For example, in determining the delay times, the cloud event mapping platform 703 may determine the least amount of time that the cloud event mapping platform 703 may use to determine an accurate translation of a particular event. In keeping the delay times small, the cloud event mapping platform 703 may achieve near real time performance in the execution of the events.

At step 855, the cloud event mapping platform 703 may determine whether an additional event has been received at the dispatcher 706. If the dispatcher 706 determines that an additional event has been received, the cloud event mapping platform 703 may return to step 840 to determine additional heuristics based on the additional event and the other events in the dispatch queue. If the dispatcher 706 determines that an additional event has not been received, the cloud event mapping platform 703 may proceed to step 860.

At step 860, the cloud event mapping platform 703 may use the dispatcher 706 to determine whether a delay time corresponding to each event in the dispatch queue has elapsed. If the delay time corresponding to each event in the dispatch queue has not elapsed, the dispatcher may wait until any remaining delay times have elapsed prior to proceeding to step 865. If the dispatcher 706 determines that all delay times have elapsed, the cloud event mapping platform 703 may proceed to step 865.

Figure 10B:
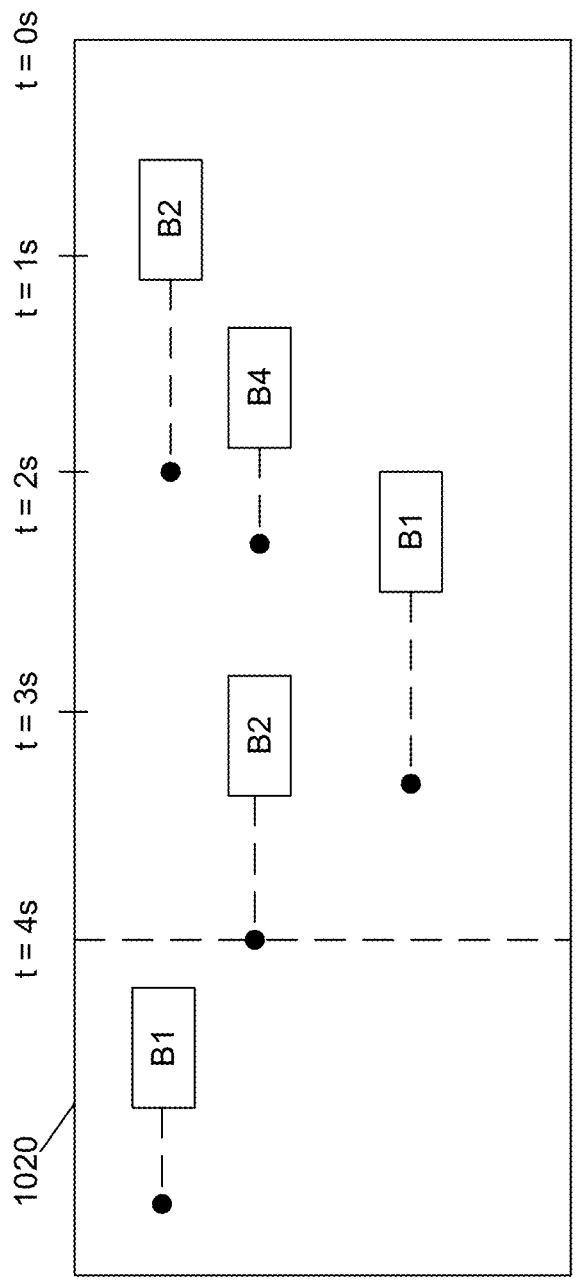

At step 865, after determining that the delay times have elapsed, the cloud event mapping platform 703 may use the dispatcher 706 to dispatch the events in the dispatch queue for processing and execution by the cloud event mapping platform 703. In some examples, because events for different files are routed and subsequently processed by various dispatchers, the cloud event mapping platform 703 may implement multithreading to improve processing efficiency and may implement throttling to improve control of resource consumption. An example of the determination of delays and dispatching based on the delays is depicted in FIG. 10B At step 870, the cloud event mapping platform 703 may generate one or more commands directing the user device 702 to cause display of a completion indication indicating successful completion of the action attempted by the user. In addition, the cloud event mapping platform 703 may generate the completion indication. For example, the completion indication may indicate "upload successful." The cloud event mapping platform 703 may send the one or more commands and the completion indication to the user device 702 while the wireless data connection is established. In sending the one or more commands and the completion indication, the cloud event mapping platform 703 may cause the completion indication to be displayed on a display of the user device 702.

Figure 9:
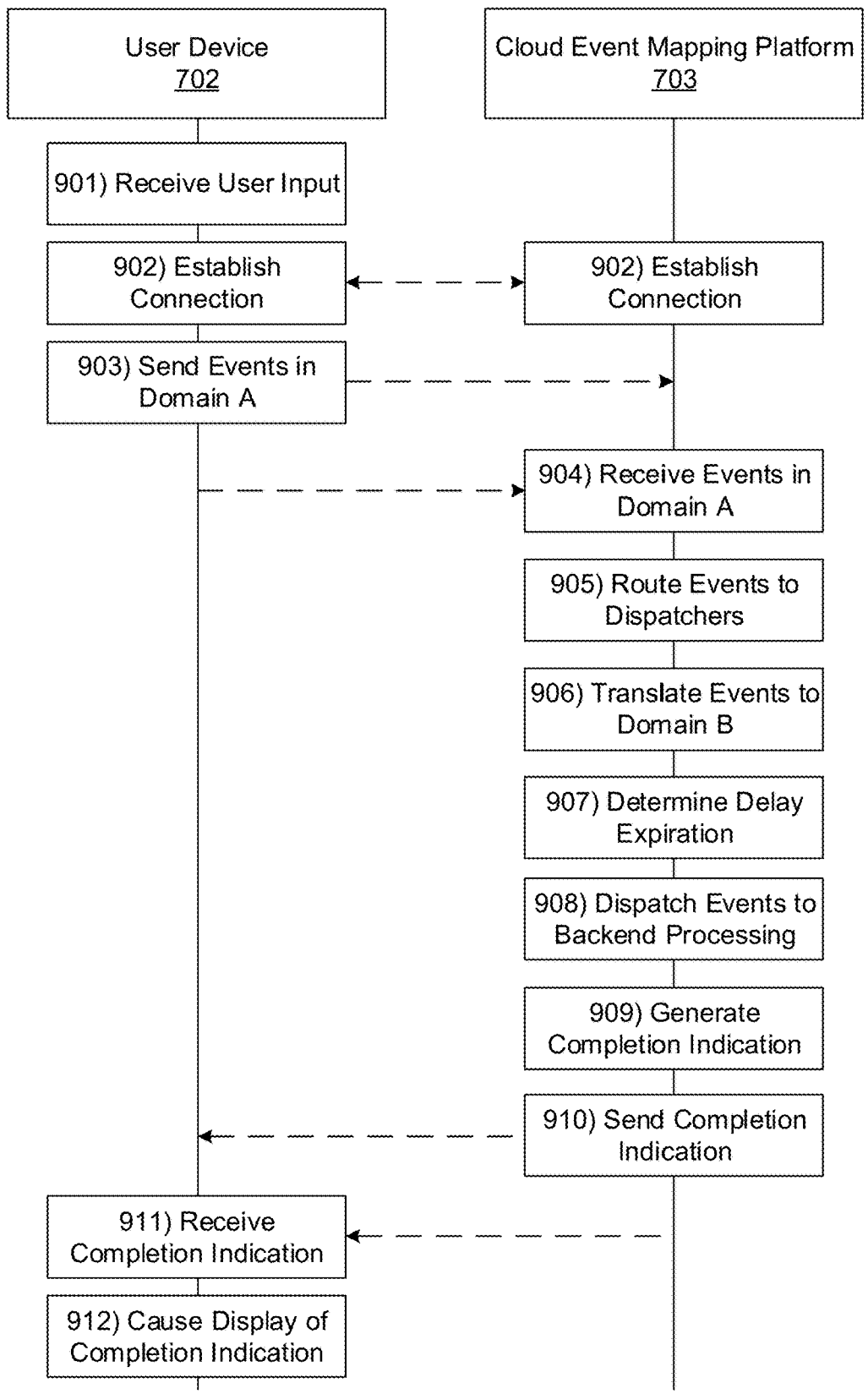
FIG. 9 depicts an illustrative event sequence for deploying a cloud event mapping platform that utilizes improved event processing and dispatch techniques in accordance with one or more illustrative aspects described herein.

FIG. 9 depicts an illustrative event sequence for deploying a platform that uses improved techniques to perform real-time event mapping from a local file system to the cloud in accordance with one or more example embodiments. In some examples, this platform may be integrated into a user device, such as user device 702. At step 901, the user device 702 may receive user input corresponding to an action to be taken at a cloud file storage application. At step 902, the user device 702 may establish a connection with cloud event mapping platform 703. At step 903, the user device 702 may send events, corresponding to the action to be taken, to the cloud event mapping platform 703. In sending the events, the user device 702 may send events corresponding to a source domain of local file storage at the user device 702. At step 904, the cloud event mapping platform 703 may receive the events sent at step 903 from the user device 702. In some examples, in receiving the events, the user device 702 may receive the events corresponding to the source domain, for example domain A as shown. In some examples, the events may be received by a file manager, such as file manager 705, hosted by the cloud event mapping platform 703. At step 905, the cloud event mapping platform 703 may use the file manager to route the events to one or more dispatchers, such as dispatcher 706, hosted by the file manager. At step 906, the dispatchers may translate the events to a destination domain, such as domain B, corresponding to the cloud environment. At step 907, the dispatchers 706 may wait for a delay corresponding to events in dispatch queues corresponding to the respective dispatchers, and may determine that the delay corresponding to each event in a dispatch queue has expired. At step 908, after determining expiration of the delays corresponding to events in a particular dispatch queue, the corresponding dispatcher 706 may dispatch the events in the particular dispatch queue for backend processing in the cloud environment (e.g., by a remote cloud storage platform). At step 909, the cloud event mapping platform 703 may determine that the action requested by the user at step 901 has been completed, and the cloud event mapping platform 703 may generate a completion indication and one or more commands directing the user device 702 to cause display of the completion indication. At step 910, the cloud event mapping platform 703 may send the completion indication and the one or more commands to the user device 702 while the connection with the user device 702 is still established. At step 911, the user device 702 may receive the completion indication and the one or more commands sent by the cloud event mapping platform 703 at step 910. At step 912, in response to the one or more commands, the user device 702 may cause display of the completion indication received at step 911.

Subsequently, the example event sequence may end, and cloud event mapping platform 703 may continue to perform real-time event mapping from a local file system to the cloud in a similar manner as discussed above (using a file manager to route events to dispatchers based on file object, translating the events from a source domain to a destination domain using stored heuristics, monitoring event delays corresponding to events in a dispatch queue, dispatching the events once all delays have expired, and the like). By operating in this way, cloud event mapping platform 703 may improve accuracy and efficiency of translating events at a local file system to cloud events.

FIG. 10A depicts an example process of routing events using a file manager and translating the events by the various dispatchers at a cloud event mapping platform as described with regard to FIGS. 8 and 9 above. Referring to FIG. 10A, a cloud event mapping platform, such as cloud event mapping platform 703 may receive events (A1, A2, A3, and the like) corresponding to actions to be performed with respect to various files (f1, f2, f3, and the like). The file manager 705 may route each of these events to a dispatcher, such as dispatcher 706, based on the file object of the event. For example, the file manager 705 may route events corresponding to f1 to a first dispatcher, events corresponding to f2 to a second dispatcher, and events corresponding to f3 to a third dispatcher. In some examples, the first dispatcher may maintain a dispatch queue 1010 that contains events routed to the first dispatcher, the second dispatcher may maintain a dispatch queue 1015, and the third dispatcher may maintain a dispatch queue 1020.

As events are routed to the various dispatchers, they may be translated from a source domain to a host domain. In some examples, a source domain event may correspond to a destination domain event. In some examples, a source domain event may correspond to a sequence of events in the destination domain. The translation may be determined based on heuristics stored by the cloud event mapping platform using a heuristic database, such as heuristic database 707. In some examples, different heuristics may be applied at each of the dispatchers. In some examples, different heuristics may be applied for different file objects.

With regard to the example in FIG. 10A, A1 may be translated to B1 in the dispatch queue 1010. As a result, the two A1 events shown at file manager 1005 may each be translated to a B1 event and added to the dispatch queue 1010. In this example, the dispatch queue 1010 may have previously included a B5 event and a B1 event corresponding to events previously received from the file manager. In dispatch queue 1015, A1 may be translated to B1, and A3 may be translated to B3. As a result, the A1 and A3 events shown at the file manager 1005 may be translated to a B1 and a B3 event respectively. In this example, the dispatch queue 1015 may have previously been empty. In dispatch queue 1020, A2 may be translated to B1 and B2. As a result, the A2 event shown in the dispatch queue 1005 may be translated to multiple events (B2 and B1) in the dispatch queue 1020. In this example, the dispatch queue 1020 may have previously included a B4 event and a B2 event.

Once the dispatch queues are generated using the heuristics, the dispatchers may apply additional heuristics from the heuristic database 707. As an example, the first dispatcher may determine that, in the dispatch queue 1010, multiple sequential events that correspond to the same event type should be collapsed. In this example, the first dispatcher may collapse the two consecutive B1 events in the dispatch queue into a single B1 event. As another example, the second dispatcher may determine that, in the dispatch queue 1015, a B3 event located next to and prior to a B1 event in the dispatch queue 1015 should be eliminated. In this example, the second dispatcher may eliminate the B3 event in the dispatch queue 1015. As yet another example, the third dispatcher may determine that, in the dispatch queue 1020, no heuristics should be applied. In this example, the dispatch queue 1020 may remain unmodified by the third dispatcher. Once the heuristics have been applied at a dispatcher, the dispatcher may begin analyzing the delays corresponding to the events in the dispatch queue of the respective dispatcher. Analysis of these delays is described with regard to FIG. 10B.

FIG. 10B depicts an example process of dispatching events based on time delay analysis at dispatchers hosted by a cloud event mapping platform as described with regard to FIGS. 8 and 9 above. Referring to FIG. 10B, a cloud event mapping platform, such as cloud event mapping platform 703 may receive multiple events at a dispatcher, such as dispatcher 706, which may store the events in a dispatch queue 1020. In this example, the dispatcher 706 may monitor delays corresponding to each event in the dispatch queue 1020, and may dispatch a set of events from the dispatch queue 1020 upon expiration of all pending delays. In this example, B1, B2, B1, B4, and B2 may be various events in the dispatch queue 1020. Time delays corresponding to each event may be represented by the tails attached to each event. The dispatcher 706 may monitor these delays to determine when events in the dispatch queue 1020 should be dispatched for execution.

For example, at t=1 second, the dispatcher 706 may determine that a B2 event has been received, and a time delay corresponding to the B2 event is still pending. Thus, the B2 event may remain in the dispatch queue 1020. At t=2 seconds, the dispatcher 706 may determine that the time delay corresponding to the B2 event has expired. However, the dispatcher 706 may also determine that a B4 event was received during the B2 time delay, and that a time delay corresponding to the B4 event is still pending. Thus, the B4 and the B2 events may both remain in the dispatch queue 1020. At t=3 seconds, the dispatcher 706 may determine that a time delay corresponding to the B4 event has expired, but that a B1 event was received during the B4 time delay and has a pending time delay. The dispatcher 706 may also determine that during the B1 time delay, another B2 event has been received and has a pending time delay. Thus, the B2, B1, B4, and B2 events may all remain in the dispatch queue 1020. At t=4 seconds, the dispatcher 706 may determine that the time delays corresponding to the B2 and the B1 events have expired, and that another event (such as the B1 event received after t=4 seconds) has not been received. In this example, the dispatcher 706 may determine that the B2, B1, B4, and B2 events may be dispatched for execution in the same order that they are presented in the dispatch queue 1020. In this example, the dotted line at t=4 s depicts the time at which events in the dispatch queue may be dispatched for execution.

In some examples, the dispatcher 706 may determine the time delays based on a preconfigured database of stored time delays corresponding to various event types. Additionally or alternatively, the dispatcher 706 may determine the time delays using one or more machine learning algorithms and one or more machine learning datasets.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing platform, comprising:
   at least one processor;
   a communication interface communicatively coupled to the at least one processor and configured to establish a connection between the computing platform and a computing device; and
   a memory communicatively coupled to the processor; and
   wherein the computing platform is configured to:
      process, using a first dispatcher, two or more of a plurality of events to generate a first dispatch queue;
      determine, using the first dispatcher, a plurality of time delays, each time delay of the plurality of time delays corresponding to a respective event in the first dispatch queue;
      determine, using the first dispatcher, that all of the plurality of time delays have expired; and
      cause execution, using the first dispatcher and based on the determination that all of the plurality of time delays have expired, of each of the two or more of the plurality of events in the first dispatch queue.

2. The computing platform of claim 1, wherein the first dispatch queue is generated by translating at least one of the two or more of the plurality of events from a first domain to a second domain.

3. The computing platform of claim 2, wherein translation of the at least one of the two or more of the plurality of events from the first domain to the second domain is performed by deleting at least one of the two or more of the plurality of events.

4. The computing platform of claim 3, wherein deletion of at least one of the two or more of the plurality of events is performed in response to determining that the first dispatch queue already contains one or more of the two or more of the plurality of events.

5. The computing platform of claim 2, wherein translation of the two or more of the plurality of events from the first domain to the second domain is performed by adding an event to the two or more of the plurality of events.

6. The computing platform of claim 1, wherein determination of the two or more of the plurality of events to be processed is performed by each dispatcher in real time as the plurality of events are received.

7. The computing platform of claim 1, wherein the computing platform is further configured to:
process, using a second dispatcher, two or more other events of the plurality of events to generate a second dispatch queue, wherein the first dispatcher corresponds to a first file object and the second dispatcher corresponds to a second file object;
determine, using the second dispatcher, that there is a remaining time delay corresponding to an event in the second dispatch queue; and
dispatch, using the second dispatcher and after determining expiration of the remaining time delay, each of the two or more other events of the plurality of events in the second dispatch queue for execution.

8. A method comprising:
processing, using a first dispatcher, two or more of a plurality of events to generate a dispatch queue;
determining, using the first dispatcher, a plurality of time delays, each time delay of the plurality of time delays corresponding to a respective event in the dispatch queue;
determining, using the first dispatcher, that all of the plurality of time delays have expired; and
dispatching, using the first dispatcher and based on the determination that all of the plurality of time delays have expired, each of the two or more of the plurality of events in the dispatch queue for execution in a cloud environment.

9. The method of claim 8, further comprising:
receiving, at a task manager hosted on a cloud event mapping platform, the plurality of events, wherein the task manager comprises a first object hosted by the cloud event mapping platform and is configured to translate events from a source domain to a destination domain by:
identifying each of the plurality of events;
determining a dispatcher for each of the plurality of events; and
providing the plurality of events to the respective dispatchers.

10. The method of claim 9, wherein the source domain corresponds to a local file system, wherein the destination domain corresponds to the cloud environment, and wherein the plurality of events correspond to events taken on cloud-based files by the local file system.

11. The method of claim 10, wherein translating the events from the source domain to the destination domain causes a cloud storage application to update data in the cloud environment based on the plurality of events from the local file system.

12. The method of claim 11, further comprising updating, based on execution of the plurality of events, the cloud storage application.

13. One or more non-transitory computer-readable media storing instructions that, when executed by a computing platform comprising at least one processor, a communication interface, and memory, cause the computing platform to:
process, using a first dispatcher, two or more of a plurality of events to generate a dispatch queue;
determine, using the first dispatcher, a plurality of time delays, each time delay of the plurality of time delays corresponding to a respective event in the dispatch queue;
determine, using the first dispatcher, that all of the plurality of time delays have expired; and
provide, using the first dispatcher and based on the determination that all of the plurality of time delays have expired, the two or more of the plurality of events in the dispatch queue for execution.

14. The one or more non-transitory computer-readable media of claim 13, wherein:
the first dispatcher is one of a plurality of dispatchers,
the plurality of dispatchers includes a second dispatcher comprising a second object hosted by the computing platform, and
the second dispatcher is configured to add an event to a second dispatch queue, perform heuristics on the second dispatch queue, and provide the second dispatch queue for execution by the computing platform after a predetermined period of time.

15. The one or more non-transitory computer-readable media of claim 14, wherein the memory stores additional computer readable media storing instructions, that when executed by the at least one processor, cause the computing platform to determine a different predetermined period of time for each event type represented in the dispatch queue.

16. The one or more non-transitory computer-readable media of claim 15, wherein the memory stores additional computer readable media storing instructions, that when executed by the at least one processor, cause the computing platform to perform the heuristics on the dispatch queue by performing one or more of: modifying, eliminating, and adding events.

17. The one or more non-transitory computer-readable media of claim 16, wherein the memory stores additional computer readable media storing instructions, that when executed by the at least one processor, cause the computing platform to dynamically adjust the predetermined period of time based on an event context.

18. The one or more non-transitory computer-readable media of claim 17, wherein each of the plurality of dispatchers are hosted by the computing platform.

19. The one or more non-transitory computer-readable media of claim 18, wherein the predetermined period of time is adjusted at the first dispatcher and wherein the event context corresponds to an event at the second dispatcher.

20. The one or more non-transitory computer-readable media of claim 14, wherein the memory stores additional computer readable media storing instructions, that when executed by the at least one processor, cause the computing platform to determine the heuristics using one or more machine learning algorithms and one or more machine learning datasets stored at the computing platform.

\* \* \* \* \*